US009940283B2

(12) United States Patent
Kanigicherla et al.

(10) Patent No.: US 9,940,283 B2
(45) Date of Patent: Apr. 10, 2018

(54) APPLICATION SHARING IN MULTI HOST COMPUTING SYSTEMS

(75) Inventors: Balaji Kanigicherla, Andhra Pradesh (IN); Sridhar Adusumilli, Hyderabad (IN); Sarveshwar Bandi, Hyderabad (IN); Narsi Reddy Annapureddy, Hyderabad (IN); Chandra Kumar Chettiar, Hyderabad (IN); Kishor Arumilli, Hyderabad (IN)

(73) Assignee: Ineda Systems Inc., Santa Clara, CA (US)

( * ) Notice: Subject to any disclaimer, the term of this patent is extended or adjusted under 35 U.S.C. 154(b) by 776 days.

(21) Appl. No.: 14/111,023

(22) PCT Filed: Apr. 9, 2012

(86) PCT No.: PCT/IN2012/000250
§ 371 (c)(1),
(2), (4) Date: Oct. 10, 2013

(87) PCT Pub. No.: WO2012/140667
PCT Pub. Date: Oct. 18, 2012

(65) Prior Publication Data
US 2014/0032810 A1    Jan. 30, 2014

(30) Foreign Application Priority Data
Apr. 11, 2011 (IN) ............................ 1258/CHE/2011

(51) Int. Cl.
*G06F 9/46* (2006.01)
*G06F 13/40* (2006.01)
(Continued)

(52) U.S. Cl.
CPC ........ *G06F 13/4027* (2013.01); *G06F 9/4843* (2013.01); *G06F 9/54* (2013.01); *G06F 2209/549* (2013.01)

(58) Field of Classification Search
None
See application file for complete search history.

(56) References Cited

U.S. PATENT DOCUMENTS 6,366,957 B1 * 4/2002 Na ........................ G06F 1/266
709/229
7,849,462 B2 * 12/2010 Traut ..................... G06F 9/445
718/1
(Continued)

FOREIGN PATENT DOCUMENTS

| CN | 1965303 | 5/2007 |
| CN | 101582926 | 11/2009 |
| WO | 2012140667 | 10/2012 |

OTHER PUBLICATIONS

International Search Report and Written Opinion for PCT/IN2012/000250 dated Nov. 15, 2012.

*Primary Examiner* — Wynuel Aquino
(74) *Attorney, Agent, or Firm* — Workman Nydegger (57) ABSTRACT

The present subject matter discloses methods and systems of application sharing in multi-host computing system (100) running multiple operating systems. In one embodiment, the method for application sharing in a multi-host computing system (100) comprises receiving a request to launch an application in a first operating system of the multi-host computing system (100) from a second operating system of the multi-host computing system (100), generating an application launch request to launch the application and transmitting the application launch request to a widget daemon running on the first operating system using a PCIe to PCIe application redirection engine. The method further comprises initiating an application sharing session between the first operating system of the multi-host computing system (100) from the second operating system of the multi-host computing system (100).

19 Claims, 5 Drawing Sheets (51) Int. Cl.
*G06F 9/48* (2006.01)
*G06F 9/54* (2006.01)

(56) References Cited

U.S. PATENT DOCUMENTS

| | | | |
|---|---|---|---|
| 2004/0168155 A1* | 8/2004 | O'Farrell | G06F 11/3664 717/129 |
| 2007/0078953 A1 | 4/2007 | Chai et al. | |
| 2009/0276773 A1 | 11/2009 | Brown et al. | |
| 2010/0153615 A1 | 6/2010 | Baba et al. | |
| 2010/0257302 A1* | 10/2010 | Suzuki | G06F 13/4027 710/314 |
| 2010/0269047 A1* | 10/2010 | Pahlavan | G06F 9/4445 715/740 |
| 2011/0055406 A1* | 3/2011 | Piper | G06F 9/5077 709/227 |
| 2013/0145072 A1* | 6/2013 | Venkataraghavan | H04L 67/1097 710/316 |

* cited by examiner

APPLICATION SHARING IN MULTI HOST COMPUTING SYSTEMS

FIELD OF INVENTION

The present subject matter relates to application sharing and, particularly but not exclusively, to application sharing in multi-host computing systems running multiple operating systems.

BACKGROUND

Computing systems, such as laptops, netbooks, workstations, etc., run different operating systems (OS), such as Linux, UNIX, Microsoft® Windows®, Mac OS X®, etc. Various applications, such as word processing tools, spreadsheets, image processing software, etc., run on the different operating systems to provide various functionalities to a user. Certain applications may be platform independent and run on all types of operating systems, whereas other applications may run only on a specific type of operating system. Sometimes it may be so required that the user using a computing system, which runs a certain kind of operating system say OS A, may need to access an application which runs on a different kind of operating system, say OS B.

Conventionally a user on a host computing system accesses one or more applications running on other remote computing system (s) through a network using remote desktop/application sharing mechanisms, for example, Remote Desktop Protocol (RDP), which usually adhere to ITU-T T.128 specifications. Sharing of the applications across the computing systems involve transfer of a large volume of data, such as visual data pertaining to the graphical user interface of the remote computing systems, from the remote computing system to the host computing system. Moreover since the data is to be transferred over a network, appropriate security measures, such as encryption need to be undertaken to ensure authenticity, integrity and confidentiality of the transferred data. Security measures, such as encryption also increases the processing load of the computing systems thus reducing performance. Additionally there is an extra cost of implementing and maintaining these security measures. Further the user's experience of using the application running on a remote computing device is largely dependent of network parameters, such as bandwidth, throughput, latency, etc. In absence of a high performance network, which is often cost intensive, the user's experience of using the application running on the remote computing system degrades considerably.

SUMMARY

This summary is provided to introduce concepts related to application sharing in multiple host computing systems running multiple operating systems. This summary is neither intended to identify essential features of the claimed subject matter nor is it intended for use in determining or limiting the scope of the claimed subject matter.

In an embodiment, the method for application sharing in a multi-host computing system comprises receiving a request to launch an application in a first operating system of the multi-host computing system from a second operating system of the multi-host computing system, generating an application launch request to launch the application and transmitting the application launch request to a widget daemon running on the first operating system using a PCIe to PCIe application redirection engine. The method further comprises initiating an application sharing session between the first operating system of the multi-host computing system from the second operating system of the multi-host computing system.

In another embodiment, a multi-host computing system configured for application comprises a plurality of processors, a first host running on at least one of the plurality of processors, wherein the first host comprises a widget server module configured to provide access to at least one of an application and a service hosted on the first host to another host of the multi-host computing system. The multi-host computing system further includes a second host running on at least one of the plurality of processors, wherein the second host comprises a widget client module configured to communicate with the widget server module to access the at least one of an application and a service hosted on the first host; and at least one PCIe to PCIe application redirection engine driver configured to facilitate communication between the widget server module and the widget client module.

BRIEF DESCRIPTION OF THE FIGURES

The above features and aspects and other features and aspects of the subject matter will be better understood with regard to the following description, appended claims, and accompanying figures. In the figures, the left-most digit(s) of a reference number identifies the figure in which the reference number first appears. The use of the same reference number in different figures indicates similar or identical items:

DETAILED DESCRIPTION

Systems and methods for application sharing in multiple host computing systems running multiple operating systems are described herein. The systems and methods can be implemented in a variety of computing devices, such as laptops, desktops, workstations, tablet-PCs, smart phones, etc. Although the description herein is with reference to certain computing systems, the systems and methods may be implemented in other electronic devices, albeit with a few variations, as will be understood by a person skilled in the art.

Conventionally different applications are configured to run on different types of operating systems. Since, every operating system provides specific functionalities and interfaces; it is not possible to run all kinds of applications on all types of the operating systems. Further resource constraints, such as limited memory, storage space, processing power, graphics processing power, etc., may prevent the installation or running of an application on a computing system. Hence a user on a host computing system may need to access an application running on remote computing systems, which may run the same or different types of operating systems.

Conventional techniques of accessing the application running on the remote computing system involve a large amount of data transfer over a network. This requires a high performance network with high bandwidth, low latency, high throughput, etc., which is cost intensive. Further, transmitting a large volume of data over a network requires security measures, such as encryptions, which come at a high cost.

Moreover usage of the application running on the remote computing system is highly dependent on the availability of network resources. Additionally there are chances of data loss or data corruption in a scenario where the remote computing system is shut down or goes offline while the user is using the application running on it. These factors make the conventional techniques of accessing the applications running on the remote computing systems unreliable.

The present subject matter discloses methods and systems of application sharing in multiple host computing systems running multiple operating systems. The multi-host computing system is a multi processor computing system which has a plurality of processors of same or varying processing power and is capable of running multiple operating systems simultaneously. In one implementation, the multiple hosts in the multi-host computing system may be configured to communicate with each other over a high bandwidth low latency bus function. Further, the multi-host computing systems may be capable of sharing the hardware platform, such as peripheral devices like display devices, audio devices, input devices, such as keyboard, mouse, touchpad, etc., among the plurality of processors running the multiple operating systems simultaneously.

In one embodiment, the multi-host computing system uses a multi-root input output virtualization (MRIOV) switch electronically connected to at least one of the plurality of the processors, a peripheral and interface virtualization unit (PIVU) connected to the MRIOV switch to enable peripheral sharing between multiple operating systems running on multiple processors. In other implementations, the multi-host computing system may use other techniques to enable peripheral sharing between multiple operating systems running on multiple processors. Various types of peripheral devices may be connected to the multi-host computing system. For example, the multi-host computing system may include or may be connected to various storage controllers, like Serial Advanced Technology Attachments (SATA), NAND flash memory, multimedia cards (MMC), Consumer Electronics Advanced Technology Attachment (CEATA); connectivity modules like baseband interfaces, Serial Peripheral Interfaces (SPI), Inter-integrated Circuit (I2C), infrared data association (IrDA) compliant devices; media controllers like cameras, integrated inter chip sound (I2S); media accelerators like audio encode-decode engines, video encode-decode engines, graphics accelerators; security modules like encryption engines, key generators; communication modules like Bluetooth, Wi-Fi, Ethernet; and universal serial bus (USB) connected devices, like pen drives, memory sticks, etc.

In one implementation the multi-host computing system includes a widget module which provides a graphical user interface to facilitate various user operations, such as accessing applications, configuring parameters of the peripheral devices, for example, brightness of the display device, volume of the audio devices, etc., of the multi-host computing system. In said implementation, the widget module includes a system configuration module, which can be used to configure various parameters pertaining to the multi-host computing system. In one implementation, the system configuration module further includes a device management module to configure and set parameters for the various peripheral devices, a power management module to implement system wide power policies and a synchronization module to synchronize data between different applications running on the same or different hosts.

The widget module also includes a platform switch module, which facilitates seamless switching from a first operating system running on a first processor to a second operating system running on a second processor. Further, the platform switch module also informs the user currently using the first operating system about the activity state, such as running, on standby, in hibernation, switched off, etc., of the second operating system. Moreover, the widget module also includes an application launcher module to launch various applications running on either of the operating systems. Additionally in said implementation, the widget module also includes a notification module, which informs the user about various system generated messages and alerts, error messages, etc., from each of the multiple hosts in the multi-host computing system.

In operation, the data storage facility of the multi-host computing system, such as a hard disk, is shared between the multiple operating systems running on the different processors. Further, the file system is shared between the multiple operating systems running on the multi-host computing system, which enables one operating system to access the partition of other operating systems. In one implementation, the file system sharing is facilitated using a PCIe to PCIe application redirection engine. The PCIe to PCIe application redirection engine enables high speed data transfer between the multiple hosts without using a network protocol. This reduces data transfer overheads. For example, header files pertaining to network protocols are no longer needed. Moreover, since the data is transferred directly from the one host to another, there is no need for additional security measures, such as encryptions. Thus, the multi-host computing system becomes more cost efficient.

The widget module, as mentioned earlier, includes the application launcher module, which is used to launch applications running on either of the operating systems. In one implementation, the user may have to click on an icon symbolizing the application to launch it. Further, in case the operating system on which the application running is in a deactivated mode, then the widget module first activates the operating system and then launches the application. Moreover, if a user running a first operating system, say OS 1, is using an application hosted on a second operating system, say OS 2, then the widget module ensures that there is no data loss and corruption. For example, if in the above example, the OS 2 receives a command to power off, then the widget module first ensures there is no active application sharing sessions in which a user of another operating system, i.e., the OS 1, is using an application running on the OS 2. If an active application sharing session is detected, then the widget module warns the user of the ongoing active application sharing sessions and ignores the power off command. In another implementation, the widget module provides a facility to override the actions of the widget module. For example, in the above mentioned scenario, the widget module may request user confirmation for powering off of the OS 2 and if the user confirmation is received, then the widget module terminates all active application sharing sessions and powers off OS 2.

In one implementation, the widget module also facilitates context sharing between the applications running on the different operating systems. For example, say the user visits a web page using a browser running on the OS 2 and copies some data to the clipboard. The copied data in the clipboard will be available for pasting in any application, say a document editor, running on the OS 1. Thus, the widget module facilitates cut-copy-paste functionalities which enhance user experience of using the multi-host computing system. Further, the widget module also facilitates data exchange or data synchronization between similar applications running on either of the operating systems. For example, in data exchange if Microsoft® Outlook® is the default mail client for the OS 1, then the default mail client of the OS 2 may access and use contacts saved in Microsoft® Outlook®. In data synchronization, whenever a contact is added, deleted or modified in the default mail client for the OS 1, then the contact list of the default mail client of the OS 2 may be synchronized with the default mail client for the OS 1. Further, if the user while using a first browser on the OS 1 bookmarks a webpage or set it as one of his favorites, the same web page may be available in the bookmarks or favorites toolbar of a second browser running on the OS 2. Further, if the user while using the first browser on OS 1 has opened multiple active sessions, the same sessions may be made available when the user opens the second browser running on the OS 2.

In one implementation, the widget module facilitates sharing of peripherals among different applications running on either of the operating systems. For example, the audio device, such as speakers, of the multi-host computing system may be concurrently used by the applications running on either of the operating systems. Further, the display unit of the multi-host computing system may be used by different applications running on either of the operating systems. In one implementation, the displays from both the operating systems OS 1 and OS 2 may be shown simultaneously as picture-in-picture mode, whereas in another implementation, the user may chose to minimize display of the one operating system and maximize the display of the other operating system. Further, in yet another implementation, the user may chose to have a split display between both the operating systems. These and other features and advantages will be described in greater detail in conjunction with the following figures.

Figure 1:
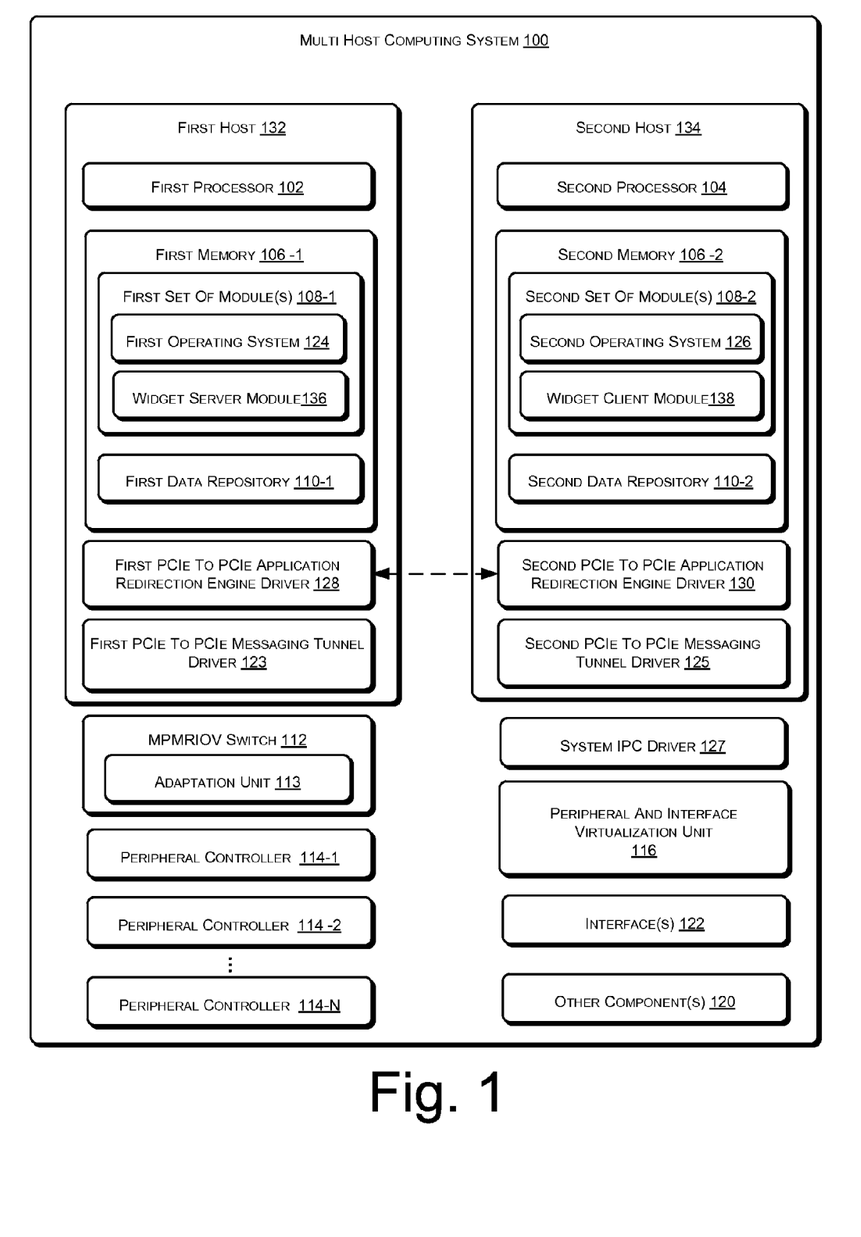
FIG. 1 shows exemplary components of a multi-host computing system, in accordance with an embodiment of the present subject matter.

FIG. 1 shows the exemplary components of the multi-host computing system 100, henceforth referred to as the system 100, according to an embodiment of the present subject matter. The system 100 can either be a portable electronic device, like laptop, smartphone, notebook, netbook, tablet computer, etc., or a non-portable electronic device like desktop, workstation, server, etc. The system 100 includes a first processor 102 and a second processor 104. The first processor 102 and the second processor 104 are coupled to a first memory 106-1 and a second memory 106-2 respectively.

The first processor 102 and the second processor 104 can be implemented as one or more microprocessors, microcomputers, microcontrollers, digital signal processors, central processing units, state machines, logic circuitries, or any devices that manipulate signals based on operational instructions. Among other capabilities, the first processor 102 and the second processor 104 can be configured to fetch and execute computer-readable instructions and data stored in the first memory 106-1 and the second memory 106-2 respectively.

The first memory 106-1 and the second memory 106-2 can include any computer-readable medium known in the art including, for example, volatile memory (e.g., RAM) and/or non-volatile memory (e.g., FLASH, etc.). The first memory 106-1 and the second memory 106-2 include a first set of module(s) 108-2 and a second set of module(s) 108-2 (collectively referred to herein as the modules 108) respectively. Further the first memory 106-1 and the second memory 106-2 also include a first data repository 110-1 and a second data repository 110-2. The module(s) 108 usually includes routines, programs, objects, components, data structure, etc., that perform particular task or implement particular abstract data types.

The system 100 includes a multi-protocol multi-root input output virtualization (MPMRIOV) switch 112 which facilitates the communication of the system 100 with connected peripherals (not shown in figure). It may be mentioned that Peripheral Component Interconnect Special Interest Group (PCI-SIG), an electronics industry consortium responsible for specifying the Peripheral Component Interconnect (PCI) and Peripheral Component Interconnect Express (PCIe) computer buses, states multi-root input output virtualization (MRIOV) as the industry standard for enabling virtualization of peripherals among multiple processors.

The MPMRIOV switch 112 includes an adaptation unit 113, which facilitates communication with peripherals, that may be non-PCI and non-PCIe compliant peripherals, with the system 100. A peripheral and interface virtualization unit 116 is coupled to a plurality of peripheral controllers 114-1, 114-2, . . . 114-N, collectively referred to as peripheral controllers 114. The peripheral and interface virtualization unit 116 helps in virtualization of the physical devices and facilitates simultaneous sharing of devices, like Ethernet, SATA, etc apart from serial sharing of devices like keyboard, mouse, display unit, USB, etc., among the multiple operating systems or multiple processors. The system 100 may also include other components 120 required to provide additional functionalities to the system 100.

The peripherals can be configured to be used exclusively by either the first processor 102 or the second processor 104 or by both the first processor 102 and the second processor 104 simultaneously. Additionally the system 100 has one or more interfaces 122 to connect to external network, systems, peripherals, devices, etc.

Moreover the system 100 also has a first PCIe to PCIe messaging tunnel driver 123 and a second PCIe to PCIe messaging tunnel driver 125. The first PCIe to PCIe messaging tunnel driver 123 and a second PCIe to PCIe messaging tunnel driver 125 facilitate exchanges of messages and commands between the first processor 102 and the second processor 104. In one embodiment, the communication between the first PCIe to PCIe messaging tunnel driver 123 and a second PCIe to PCIe messaging tunnel driver 125 is carried out using a low latency data bus through a system PCIe to PCIe messaging tunnel driver 127.

Further, the system 100 also includes a first PCIe to PCIe application redirection engine driver, also referred to as first PCIe to PCIe application redirection engine driver 128 and a second PCIe to PCIe application redirection engine driver 130 corresponding to the first processor 102 and the second processor 104 respectively. The first PCIe to PCIe application redirection engine driver 128 and the second PCIe to PCIe application redirection engine driver 130 facilitate high speed data communication. In one implementation this may be done using a dedicated high speed data bus.

When the system 100 is booted, a primary operating system is loaded. In one example, a first operating system 124, referred to as OS-A, running on the first processor 102 may be designated as the primary operating system while a second operating system 126, referred to as OS-B, running on the second processor 104 is treated as the secondary operating system. If multiple operating systems are present, the system 100 allows the user to designate any of the operating systems as the primary operating system. The user can change the primary operating system according to user's choice and/or requirement. The system 100 also allows the user to switch from one operating system to another operating system seamlessly. The system 100 can concurrently run multiple operating systems on the first processor 102 and the second processor 104.

The system 100, for ease of explanation, has been depicted as having two hosts, namely, a first host 132 and a second host 134. However, it will be known to those skilled in the art that the same concepts may be extended to any number of hosts. The first host 132 includes the first processor 102, the first memory 106-1, the first PCIe to PCIe messaging tunnel driver 123 and the first PCIe to PCIe application redirection engine driver 128. Similarly, the second host 134 includes the second processor 104, the second memory 106-2, the second PCIe to PCIe messaging tunnel driver 125 and the second PCIe to PCIe application redirection engine driver 130. The other components of the system 100 are concurrently shared by the two hosts 132 and 134.

For the sake of explanation, the first host 132 is being depicted to have the functionalities of a server, i.e., it can adhere and respond to requests made by other computing systems. The second host 134 is depicted to have the functionalities of a client where it can send requests to a server and use services provided by the server. However it should be appreciated by those skilled in the art that embodiments where the first host 132 is configured as a client and the second host 134 is configured as a server are also possible. In yet another embodiment, both the first host 132 and the second host 134 have been configured to have the functionalities of both the server and the client.

In said embodiment, the first host 132 includes a widget server module 136, which provides the functionalities of a server and the second host 134 includes a widget client module 138, which allows the second host 134 to access various applications and services running on the first host 132. The widget client module 138 connects to the widget server module 136 to access various applications hosted on the first host 132. In one embodiment, the communication of commands and instructions between the hosts 132 and 134 are done using the PCIe to PCIe messaging tunnel drivers 123 and 125, whereas the data transfer between the hosts 132 and 134 are done using the PCIe to PCIe application redirection engine drivers 128 and 130, which facilitate high speed data transfer.

In one embodiment, the widget client module 138 includes the application launcher module, which is used to launch applications running on the first host 132. For example the user may click on an icon symbolizing the application to launch it. In a scenario, where the user on the second host 134 requests the launching of an application hosted on the first host 132, the widget client module 138 first determines if the first operating system 124 on the first host 132 is up and running If the first operating system 124 is in a deactivated mode, such as powered off or in standby mode or in hibernation, the widget client module 138 activates the first operating system 124 and then launches the application and makes it available to the user on the second host 134.

Moreover the widget modules 136 and 138 ensure that there is no data loss and corruption. For example, if in the above example, if the first operating system 124 receives a command to power off, then the widget server module 136 determines if an active application sharing session is in progress. If there are active application sharing sessions and the widget server module 136 ignores the power off command. In another implementation, the user may override the actions of the widget server module 136. For example, in the above mentioned scenario, the widget server module 136 may request user confirmation for powering off the first operating system 124.

Further context sharing between applications running on the different operating systems is facilitated by the widget modules 136 and 138. In one embodiment, the widget modules 136 and 138 facilitate the access of a local buffer of the one operating system by the other operating system to enable context sharing, whereas in another implementation, the local buffer of one operating system is copied to the local buffer of the other operating system to facilitate context based sharing The widget modules 136 and 138 facilitate cut-copy-paste functionalities across applications running on either of the hosts 132 and 134, which enhances user experience of using the system 100. Thus the system 100 enables the user to use the applications running on the different operating systems without compromising on security or user experience.

Figure 2:
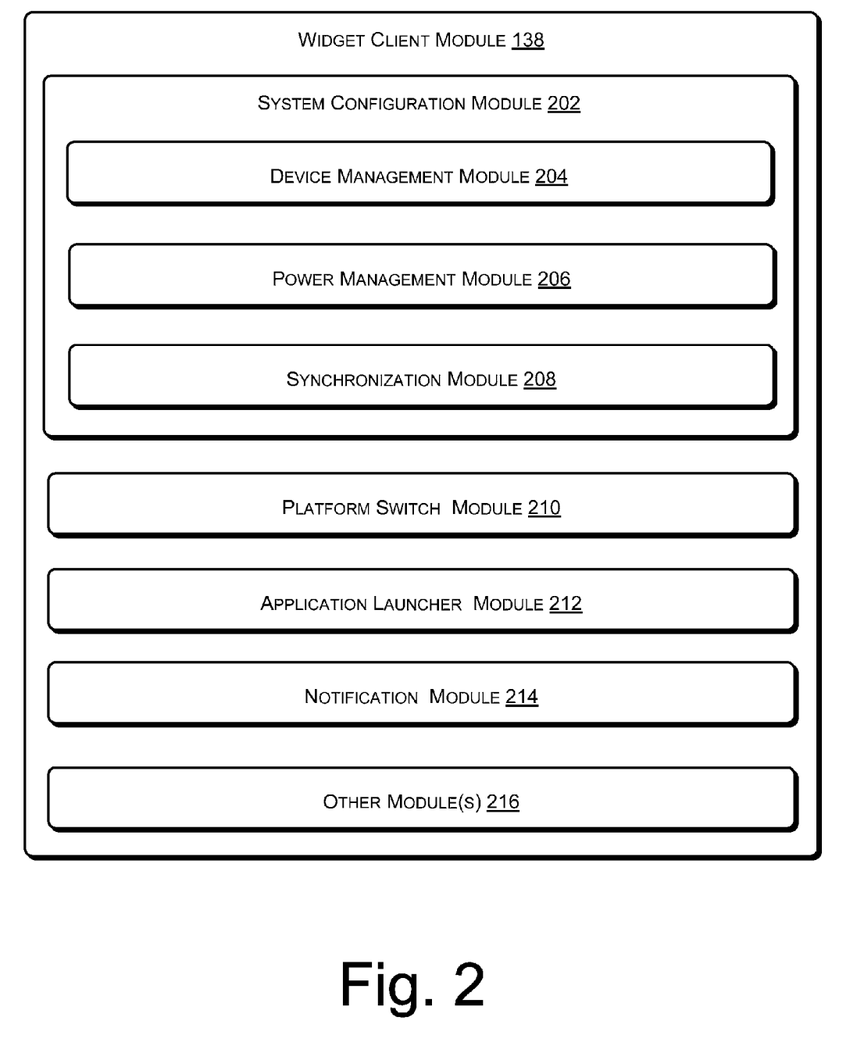
FIG. 2 shows exemplary components of a widget client module according to an embodiment of the present subject matter.

FIG. 2 shows exemplary components of the widget client module 138 according to an embodiment of the present subject matter. In one embodiment, the widget client module 138 may be a graphical user interface with icons symbolizing the various applications and utilities installed on the hosts 132 and 134. The user may configure various display parameters of the widget client module 138, such as positioning on the display unit, auto-hide or always on top display mode, transparency, etc.

In one embodiment, the widget client module includes a system configuration module 202, which may be used to configure various parameters of the system 100. In said implementation, the system configuration module 202 includes a device management module 204, which is used to set various parameters related to peripheral devices connected to the system 100. For example, the device management module 204 may assign or change ownership of a peripheral device, change the permission of either of the hosts 132 and 134 to use the peripheral device, etc. The system configuration module 202 also includes a power management module 206 to control power settings of the various peripheral devices and implement various power schemes. For example, on receiving a user instruction to maximize battery life, the power management module 206 may reduce the brightness of the display, throttle down the processor speed, etc., so as to decrease power consumption and enhance battery life. The system configuration module 202 further includes a synchronization module 208 to synchronize data between the two hosts 132 and 134. For example, the browsing history, active sessions, bookmarks, etc., of a browser in the first operating system 124 may be synchronized with the browsing history, active sessions, bookmarks, etc., of a browser in the second operating system 126. The synchronization module 208 may be configured to synchronize data between different applications running on the hosts 132 and 134 either on a regular basis, or on occurrence of any event like closing of the application, switching of a host or on receiving user input trigger through either software or hardware.

The widget client module 138 also includes a platform switch module 210 to facilitate the user from switching from the one operating system to another. For example, the user may click on an icon of the platform switch module 210 to switch from the first operating system 124 running on the first host 132 to the second operating system 126 on the second host 134. The switching may result in the first operating system 124 to move to a low power state or move to a deactivated state, such as standby mode, hibernation, etc. Moreover the switching may require the operating system, to which the user wants to switch, to be activated from a powered off, standby or hibernated mode. In one embodiment, the platform switch module 210 may provide visual indication about the state of the other operating system to which the user wants to switch to.

Further, the widget client module 138 includes an application launcher module 212. The application launcher module 212 includes icons, which can be used to launch applications hosted on the first host 132. In one embodiment, the application launcher module 212 may be a multi tiled or multi tabbed application where icons of applications hosted on either of the first host 132 are stored. Clicking on the icon initiates the process of launching an application, which is described in greater detail with reference to FIG. 3. In one embodiment, the icons for launching various applications running on either of the hosts 132 and 134 may be made available to the application launcher module 212 through sharing of the file systems and storage (like SATA) of the operating systems 124 and 126.

In said implementation, the widget client module 138 also includes a notification module 214, which notifies the user of system generated messages, such as error messages such as failure to launch an application, failure to switch between the operating systems, warning messages, such as low battery, low disk space, notification messages like SMS alerts, MMS alerts, phone calls, etc. In one implementation the notification module 214 may generate error messages or warning messages and display the same in form of pop ups.

Further the widget client module 138 may also include other module(s) 216 for providing additional functionalities. The widget client module 138 interacts with the widget server module 136 to implement a client-server architecture which facilitates data communication between the first host 132 and the second host 134 through the PCIe to PCIe application redirection engine drivers 128 and 130. Further instructions and commands are communicated between the hosts 132 and 134 with the help of the PCIe to PCIe messaging tunnel drivers 123 and 125. Thus the widget client module 138 facilitates easy user interaction and enhances user experience of using the system 100 by providing various functionalities and utilities.

Figure 3:
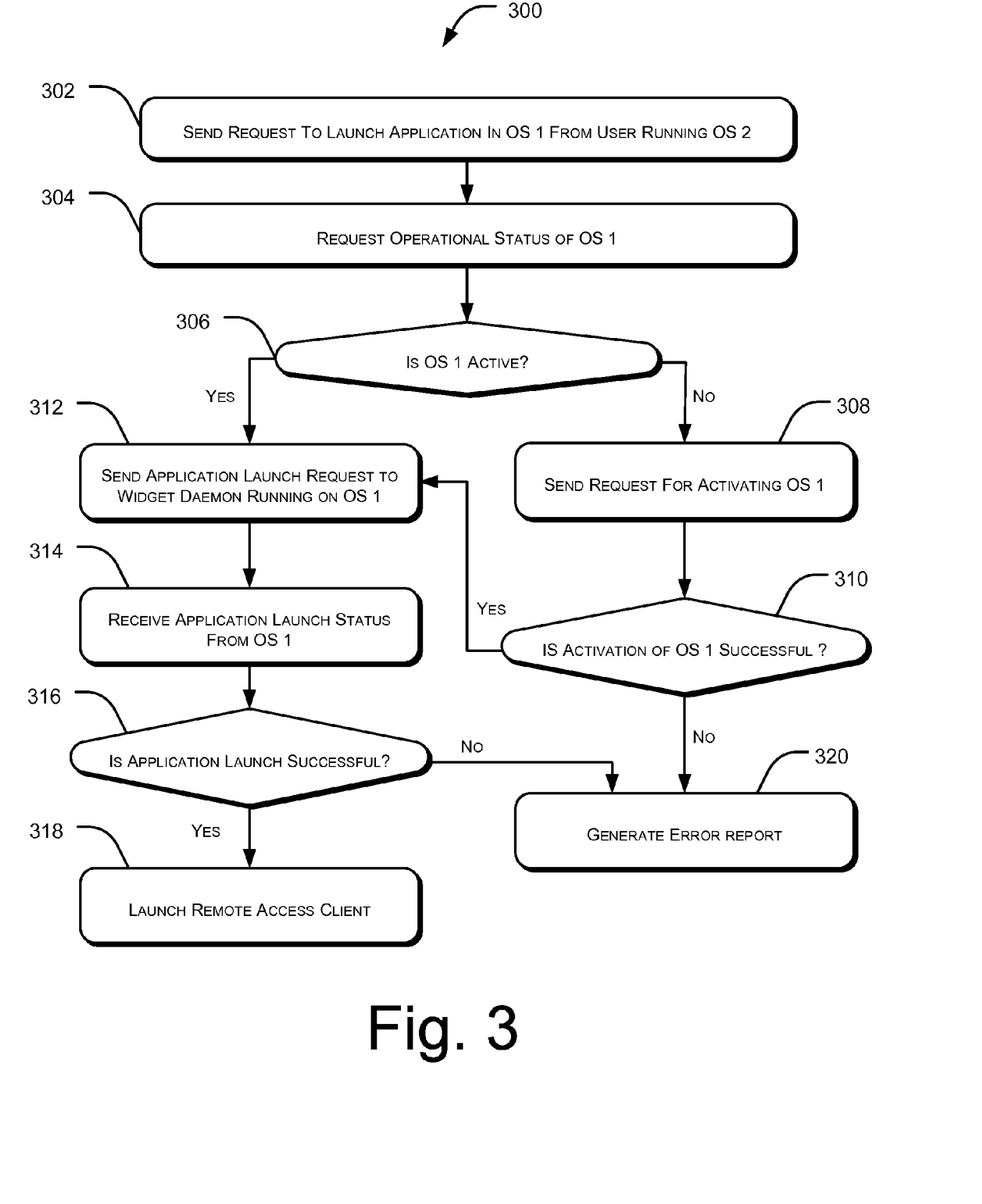
FIG. 3 illustrates an exemplary method for launching an application on a remote host, according to an embodiment of the present subject matter.

FIG. 3 illustrates an exemplary method 300 for launching an application on a remote host, according to an embodiment of the present subject matter. The method 300 may be described in the general context of computer executable instructions. Generally, these computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or an alternative method. Additionally, individual blocks may be deleted from the method 300 without departing from the spirit and scope of the subject matter described herein. Furthermore, the method 300 can be implemented in any suitable hardware, software, firmware, or combination thereof. Moreover for the sake of explanation and clarity, the host in which the user is assumed to be active in the second host 134, which is running the second operating system 126.

At block 302, the second operating system 126 receives an application launch request from the user to launch an application hosted in the first operating system 124. In one embodiment the application launch request is received by the application launcher module 212. At block 304, the second operating system 126 requests for the activity or an operational state of the first operating system 124. For example, the operational state of the first operating system 124 may be active, powered off, sleep, hibernated, etc.

In one implementation, the system 100 may follow the Advanced Configuration and Power Interface (ACPI) specification, which provides an open standard for device configuration and power management. The ACPI specification defines 6 possible states of an ACPI compliant system, where S0 indicates a state in which the system is active, S1 indicates a state in which only the essential devices remain powered on and the processor does not execute any commands and instructions, S3 indicates a state in which the processor is powered off, S4 is a state in which the random access memory is kept power on, S5 is the state in which the contents of the random access memory is saved to the memory and S6 indicates the switched off state of the system. The S3 state is conventionally referred to as Standby, Sleep, or Suspend to RAM states, whereas the S4 state is conventionally known as Hibernation or Suspend to Disk state. However it should be appreciated by those skilled that in other embodiments, the system 100 may follow any other conventional power management techniques, such as Advanced Power Management (APM), albeit minor variations.

The operation state of the first operating system 124 is determined at block 306. If the first operating system 124 is in an inactive state, at block 308 an activation request is sent to activate the first operating system 124, i.e., to switch the first operating system 124 to the S0 state. At block 310, the second operating system 126 determines if activation of the first operating system 124 was successful or not. If the activation of the first operating system 124 failed due to any reason, an error message is generated and displayed to the user as shown in block 320. In one embodiment, the user may be notified about the error through a notification module 214.

If at block 306, the first operating system 124 was determined to be active or if at block 310, the first operating system 124 was successfully activated, a request to launch the user specified application is sent to a widget daemon running on the first operating system 124, as shown in block 312. A daemon is usually a program or script that runs in the background, rather than under the direct control of the user and are usually initiated as background processes to support other applications.

The application launch status is received as shown in block 314. From the application launch status received, it is determined if the application launch was successful as shown in block 316. If the application launch was unsuccessful, an error message is generated and displayed to the user as shown in the block 320. In one embodiment, the user may be notified about the error through the notification module 214. If the application launch is successful, a remote access client to interact with the launched application is started as shown in block 318. In one embodiment the remote access client is analogous to remote desktop client or virtual network computing (VNC) viewer client. Thus the remote access client provides a graphical user interface to the user to use or interact with the launched application.

Figure 4:
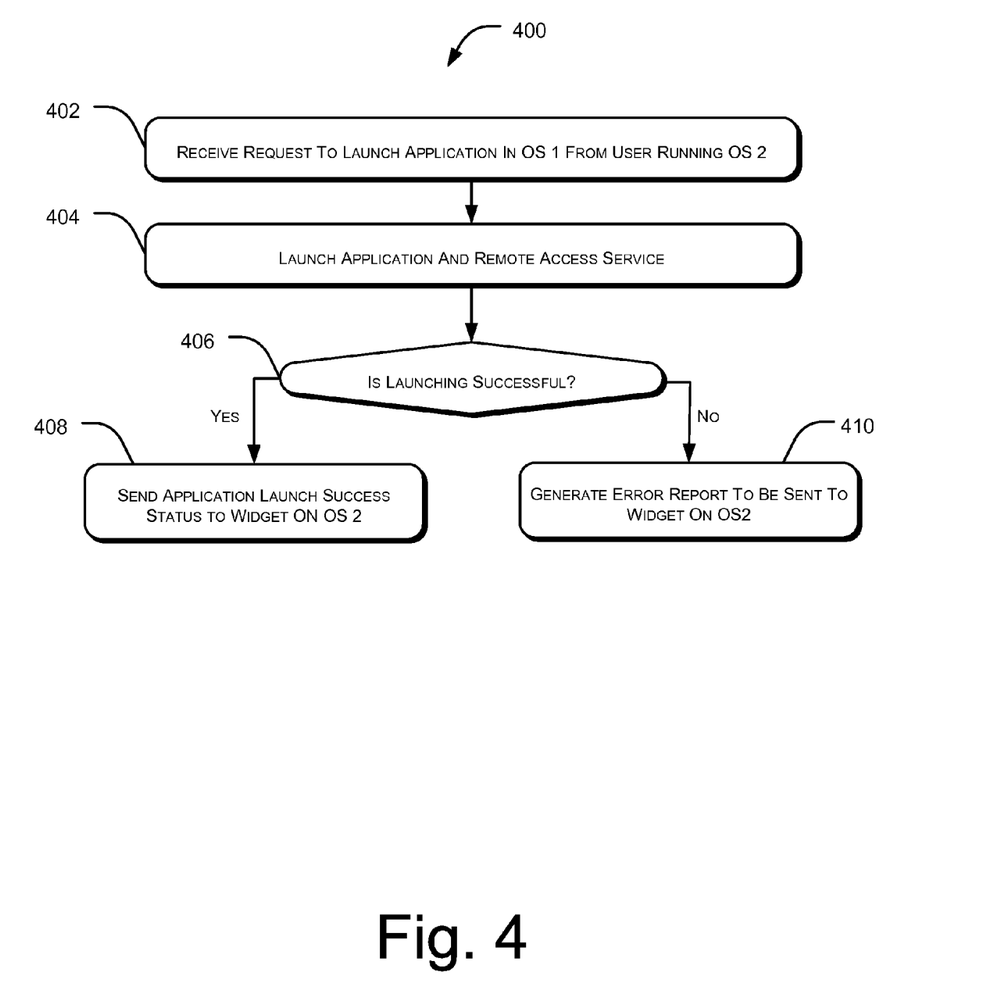
FIG. 4 illustrates an exemplary method for launching an application on receiving a request from a remote host, according to an embodiment of the present subject matter.

FIG. 4 illustrates an exemplary method 400 for launching an application on receiving a request from a remote host, according to an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400, or an alternative method. Additionally, individual blocks may be deleted from the method 400 without departing from the spirit and scope of the subject matter described herein. Furthermore, the method 400 can be implemented in any suitable hardware, software, firmware, or combination thereof. Moreover for the sake of explanation and clarity, the host in which the user is assumed to be active in the second host 134 which is running the second operating system 126.

At block 402, the first operating system 124 receives a request from the second operating system 126 to launch an application. The first operating system 124 then attempts to launch the requested application as depicted in block 404. The launching of the application may require starting of some background services or powering on or activating some peripheral devices.

At block 406, it is determined if the application launch was successful. An application launch may fail for various reasons. If the application launch is successful then the first operating system 124 sends a successful launch status for the second operating system 126 as depicted in block 408. Further the first operating system 124 may start other services, such as remote access service which would allow the user using the second operating system 126 to use and interact with the launched application.

If at block 406, it is determined if the application launch was unsuccessful, then the first operating system 124 sends an error report to the second operating system 126 as depicted at block 410. In one embodiment, the notification module 214 may be used to notify the user of the failure to launch the application and to display the error message.

Figure 5:
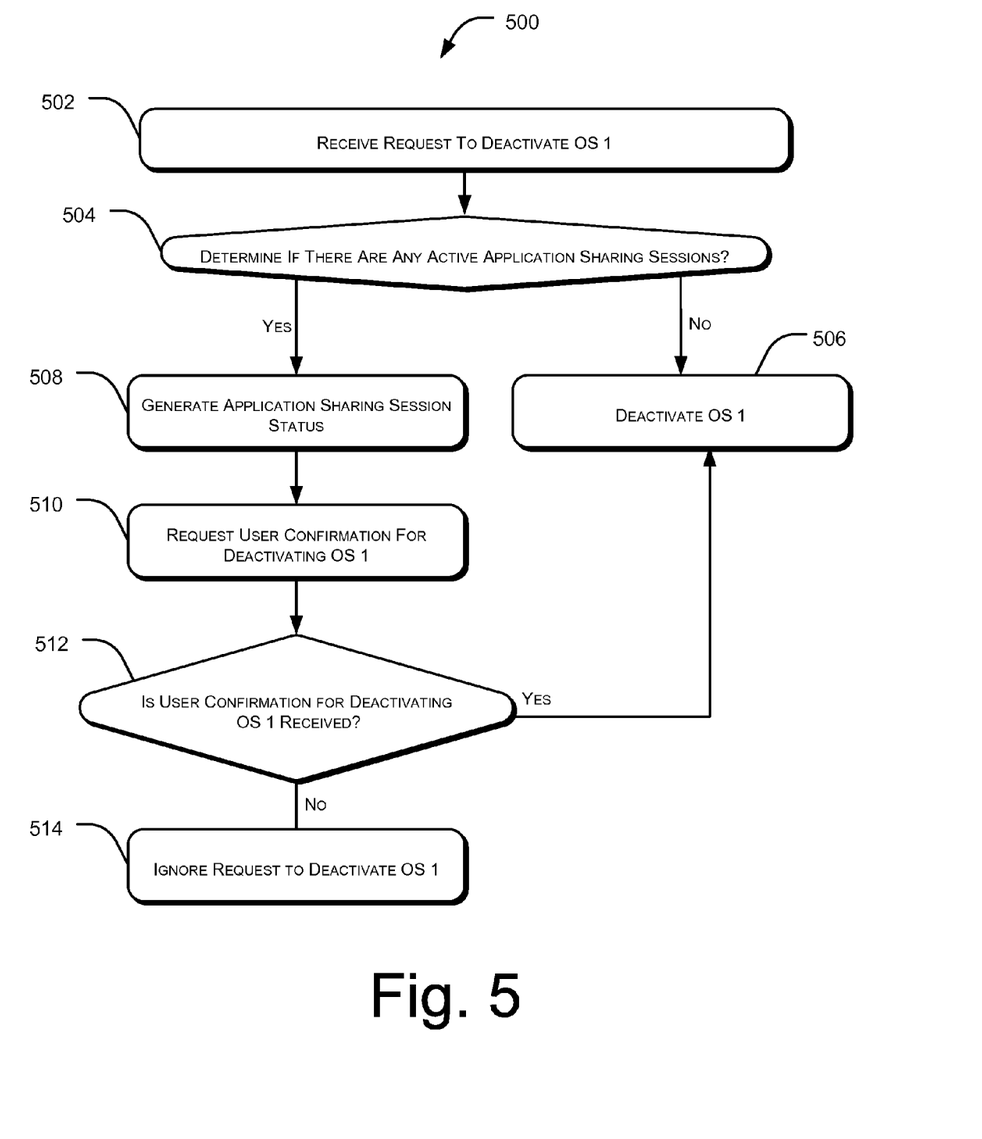
FIG. 5 illustrates an exemplary method for prevention of data loss/corruption during powering off of an operating system, according to an embodiment of the present subject matter.

FIG. 5 illustrates an exemplary method 500 for prevent data loss/corruption during powering off of an operating system, according to an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500, or an alternative method. Additionally, individual blocks may be deleted from the method 500 without departing from the spirit and scope of the subject matter described herein. Furthermore, the method 500 can be implemented in any suitable hardware, software, firmware, or combination thereof. Moreover for the sake of explanation and clarity, the host in which the user is assumed to be active in the second host 134 which is running the second operating system 126.

At block 502, a request is received to deactivate the first operating system 124. Deactivating the first operating system 124 includes hibernating the first operating system 124 or switching the first operating system 124 to a standby mode or powering off the first operating system 124. At block 504 the widget modules 132 and 134 determine if there are any active or ongoing application sharing sessions. If no active or ongoing application sharing sessions are detected, the first operating system 124 is deactivated as depicted in block 506.

If at block 504, an active or ongoing application status is detected, the widget modules 132 and 134 generate an application sharing status as shown in block 508. The application sharing session status may include various parameters, such as connection time, idle time, open files, etc. At block 510, user confirmation for deactivating the first operating system 124 is requested. If at block 512 the user confirms the deactivation of the first operating system 124, the first operating system 124 is deactivated as depicted in block 506 else the request for deactivating the first operating system 124 is ignored as depicted in block 514.

The above method 500 prevents data corruption or data loss during application sharing sessions by warning the user of active application sharing status, when a request to shutdown the first operating system 124 is received.

Although implementations for application sharing in a multi-host computing system have been described in language specific to structural features and/or methods, it is to be understood that the appended claims are not necessarily limited to the specific features or methods described. Rather, the specific features and methods are disclosed as exemplary implementations for application sharing.

We claim:

1. A method for application sharing in a multi-host computing system, the method comprising:
within the multi-host computing system implementing multiple hosts and comprising a plurality of processors wherein each of the multiple hosts are implemented with a processor from amongst the plurality of processors, generating an application share request from a second operating system running on a second host of the multi-host computing system to share an application hosted on a first operating system running on a first host of the multi-host computing system;
transmitting the application share request to the first operating system using a Peripheral Component Interconnect Express (PCIe) to PCIe messaging tunnel implemented over a high bandwidth low latency bus, wherein the PCIe to PCIe messaging tunnel is configured as a PCIe device with respect to each host of the multi-host computing system, and wherein the high bandwidth low latency bus communicatively couples each host of the multiple hosts within the multi-host computing system;

generating an application launch request, by the first operating system, to launch the application, based in part on the transmitted application share request;

initiating the application launch request to a widget daemon running on the first operating system;

launching, by the widget daemon and based upon the application launch request, the application by the first operating system based in part on the transmitted application share request;

determine the application launch is successful;

executing, based upon the determining, a remote access service of the widget daemon to provide an access of the application launched in the first operating system to the second operating system;

initiating, based on the executing, an application sharing session for sharing the application, wherein the application sharing session is based on configuration parameters defined by the widget daemon, and after initiating the application sharing session, exchanging application sharing session data for the sharing between the multiple hosts, the application sharing session data being shared over a PCIe to PCIe application redirection engine implemented over a high speed data bus, wherein the PCIe to PCIe application redirection engine provides for direct transfer data among the multiple hosts, and wherein the PCIe to PCIe application redirection engine being configured as a PCIe device with respect to each host of the multi-host computing system, and wherein the PCIe to PCIe application redirection engine is separate from the PCIe to PCIe messaging tunnel.

2. The method as claimed in claim 1, wherein the method further comprises:
determining an operational state of the first operating system; and
generating an activation request for activating the first operating system on determining the first operating system to be in an inactive state, wherein the transmitting is based in part on activating the first operating system.

3. The method as claimed in claim 1, wherein the method further comprises:
determining an application launch status of the application; and
launching a remote access client on determining the application launch status to be successful, wherein the initiating of the application sharing session is based in part on launching the remote access client.

4. The method as claimed in claim 1, wherein the method further comprises:
receiving a request to deactivate the first operating system of the multi-host computing system;
determining a status of the application sharing session; and
deactivating the first operating system on determining the status of the application sharing session to be inactive.

5. The method as claimed in claim 4, wherein the method further comprises:

requesting user confirmation input in the second operating system to deactivate the first operating system on determining the status of the application sharing session to be active; and
deactivating the first operating system on receiving the user confirmation input.

6. The method as claimed in claim 4, wherein the exchanging of the application sharing session data further comprises performing at least one of a data exchange and a data synchronization between the first operating system and the second operating system over at least one of the PCIe to PCIe messaging tunnel and the PCIe to PCIe application redirection engine.

7. The method as claimed in claim 1, wherein the method further comprises generating a display of the application launched by the first operating system for a user operating on the second operating system, wherein the display is in at least one of a picture in picture (PIP) mode, a full screen mode, and a split screen mode.

8. A multi-host computing system comprising:
a plurality of processors;
multiple hosts, wherein each of the multiple hosts is implemented with a processor from amongst the plurality of processors, and wherein the multiple hosts includes at least a first host and a second host wherein;
a the second host running on one of the plurality of processors comprises;
a widget client module configured to;
generate an application share request from a second operating system running on the second host, to share an application hosted on a first operating system running on the first host of the multi-host computing system; and
transmit the application share request to the first operating system using a Peripheral Component Interconnect Express (PCIe) to PCIe messaging tunnel; and
the first host running on another of the plurality of processors, wherein the first host comprises;
the first operating system configured to:
generate an application launch request, based in part on the transmitted application share request; and
initiate the application launch request to a widget daemon;
the widget daemon configured to;
launch the application based on the application launch request and in part on the transmitted application share request;
execute, upon successful launch of the applicaton, a remote access service of the widget daemon to provide an access of the application launched in the first operating system to the second operating system; and
initiate an application sharing session for sharing the application, wherein the application sharing session is based on configuration parameters defined by the widget daemon;
at least one PCIe to PCIe application redirection engine driver implemented over a high bandwidth low latency configured to exchange application sharing session data between the widget daemon and the widget client module, once an the application sharing session is established, wherein the at least one PCIe to PCIe application, redirection engine facilitates direct transfer data among the multiple hosts; and
at least one PCIe to PCIe application messaging tunnel driver configured to transmit the application share request from the second host to the first host, wherein the at least one PClie to PCIe application messaging tunnel driver is separate from at least one PCIe to PCIe application redirection engine driver.

9. The multi-host computing system as claimed in claim 8, wherein the at least one PCIe to PCIe application redirection engine driver is at least one of the PCIe based inter host communication bus driver and a PCIe based on-chip PCIe to PCIe messaging tunnel driver.

10. The multi-host computing system as claimed in claim 8, wherein at least one of the PCIe to PCIe messaging tunnel and the PCIe to PCIe application redirection engine is configured as a non-PCIe interface, wherein at least one of the PCIe to PCIe messaging tunnel and the PCIe to PCIe application redirection engine is configured as a direct connect device for each host of the multi-host computing system on the non-PCIe interface.

11. The multi-host computing system as claimed in claim 8, wherein the widget client module further comprises a system configuration module configured to set at least one system parameter of the multi-host computing system.

12. The multi-host computing system as claimed in claim 11, wherein the system configuration module further comprises a synchronization module configured to synchronize data between the first host and the second host by initiating exchange of application sharing session data.

13. The multi-host computing system as claimed in claim 12, wherein the data synchronized between the first host and the second host includes at least one of clipboard data and buffer data.

14. The multi-host computing system as claimed in claim 8, wherein at least one of the widget server module and the widget client module is configured to determine a status of the application sharing session between the first host and the second host.

15. The multi-host computing system as claimed in claim 8, wherein the multi-host computing system further comprises at least one PCIe to PCIe messaging tunnel driver configured to facilitate exchange of data among the plurality of processors.

16. The multi-host computing system as claimed in claim 9, wherein each of the plurality of processors is configured to run an operating system, such that a plurality of operating systems of the multi-host computing system are at least one of homogeneous and heterogeneous operating systems.

17. The multi-host computing system as claimed in claim 9, wherein the widget client module further comprises a platform switch module configured to facilitate switching a user from a first operating system to a second operating system.

18. The multi-host computing system as claimed in claim 9, wherein the widget client module further comprises an application launcher module configured to launch the at least one application hosted on the first host based on a user input.

19. The multi-host computing system as claimed in claim 18, wherein the application launcher module is further configured to generate an application launch request to launch the at least one of an application and a service hosted on the first host based on the user input.

* * * * *